No. 654,258. Patented July 24, 1900.
J. P. IHART.
PROCESS OF SEPARATING WATER FROM EMULSIONS, &c.
(Application filed Feb. 5, 1897.)
(No Model.)
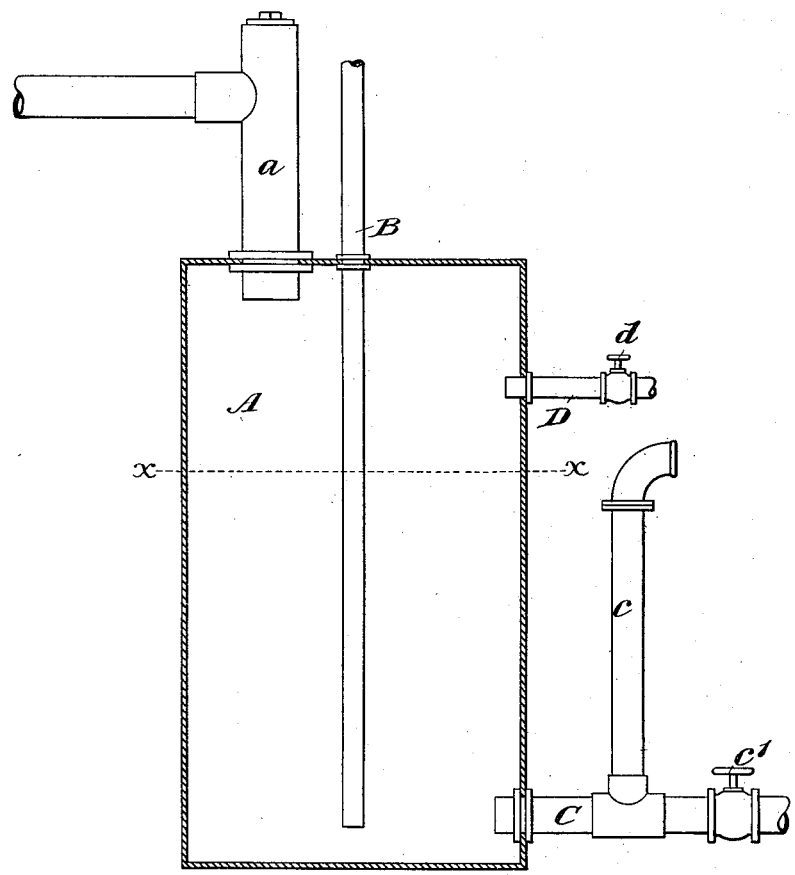

UNITED STATES PATENT OFFICE.

JOHN P. IHART, OF NEW YORK, N. Y., ASSIGNOR OF ONE-HALF TO ARTHUR H. ELLIOTT, OF SAME PLACE.

PROCESS OF SEPARATING WATER FROM EMULSIONS, &c.

SPECIFICATION forming part of Letters Patent No. 654,258, dated July 24, 1900.

Application filed February 5, 1897. Serial No. 622,115. (No specimens.)

*To all whom it may concern:*

Be it known that I, JOHN P. IHART, of New York, in the county and State of New York, have invented a new and useful Improvement in Processes of Separating Water from Emulsions, Mixtures, and Compounds of Oil and Water, of which the following is a specification.

My invention relates to an improvement in the process of separating water from emulsions, mixtures, and compounds of oil and water with the object in view of effecting the separation in a safe and expeditious manner; and it consists in passing the emulsion, mixture, or compound to be treated through a layer of dehydrated oil or tar while the latter is maintained at a temperature sufficiently high to expel the water from the emulsion, mixture, or compound as fast as the latter comes into contact with the dehydrated mass.

Hitherto in undertaking to separate water from emulsions, mixtures, and compounds of oil and water or tar and water by subjecting the mass to the influence of heat the water would not pass off from the mass until the latter had reached a degree of heat far above that of the boiling-point of water, so that the water after being converted into steam was further superheated in the mass and finally escaped in a sudden rush after the manner of an explosion of greater or lesser intensity, rendering it unsafe for the attendants and unsatisfactory because of the sudden lifting of more or less of the mass of oil or tar into the steam-discharge conduit. My present invention entirely overcomes the danger and objections heretofore encountered and provides for a steady and rapid separation completely under the control of the attendant.

The accompanying drawing represents in elevation, partly in section, one form of an apparatus which may be used to carry my process into practical effect.

A represents a separating vessel of such structure as to admit of applying heat thereto to keep the contents at a temperature of 300° Fahrenheit, more or less. Through its top there extends a discharge-pipe $a$ for conveying away the steam and such light products as may pass off at the temperature required to discharge the water. A pipe B terminates near the bottom of the vessel A for conveying to the interior of the vessel the emulsion, mixture, or compound to be treated. An outlet-pipe C leads from a point at or near the bottom of the vessel and has in communication therewith an overflow branch $c$, extending upwardly to a point at the height to which it is found desirable to maintain the mass within the vessel. The pipe C is provided with a stop-cock $c'$ for convenience in drawing off the mass when desired, and a test-pipe D, with a cock $d$, is located at the upper portion of the vessel. The object of locating the pipe D intermediate of the height of the overflow and the mouth of the escape at the top of the vessel is to determine whether or not there is any foam forming on the surface of the liquid which would be liable to enter the escape-pipe. If there is, the cock $d$ is opened and the foam allowed to escape.

In operation the vessel A is filled to a height at or somewhat below the dotted line $x\ x$ with a dehydrated oil or tar, and this is heated to and maintained at a temperature of 300° Fahrenheit, more or less, the degree of temperature being that at which the water will escape from the particular oil or tar being treated. The mass from which the water is to be expelled is then allowed to flow into the bottom of the heated mass of dehydrated material at such a rate as may be found expedient. As fast as it comes into contact with the heated mass the water is expelled, rising to the surface and passing off through the pipe $a$. The mass of dehydrated material is kept at the level of the mouth of the overflow-pipe $c$ by the graduated discharge of the dehydrated material as it accumulates within the vessel A.

One use to which I have applied this process with eminent success is the separation of water from the tar resulting from the use of petroleum in the manufacture of gas for lighting and heating purposes. For this particular purpose I fill the vessel A up to the line $x\ x$ with the dehydrated tar raised to and maintained at a temperature of about 300° Fahrenheit, and into the bottom of this mass, through the pipe B, I introduce the mixture of tar and water resulting from the use of petroleum in the manufacture of gas. As the hydrated tar comes in contact with the dehydrated mass the water is dispelled and passes off in the form of steam from the escape $a$, while the dehydrated mass is kept substantially at the level $x\ x$ by the overflow of the surplus, due to the introduction of the hydrated mass, through the overflow $c$. I do not, however, wish to limit myself to this use, as the process is applicable to all mixtures, emulsions, and compounds of animal, vegetable, and mineral oils susceptible to distillation.

What I claim is—

The process of separating water from mixtures, emulsions and compounds of oil or tar and water consisting in gradually passing the mixture, emulsion or compound to be treated, into a mass of the dehydrated oil or tar previously heated to a degree of heat in excess of that which would cause the separation of water as steam from a mass of hydrated oil or tar whereby the water is driven off from the inflowing stream of hydrated oil or tar immediately on its becoming mixed with the heated dehydrated material, substantially as set forth.

JOHN P. IHART.

Witnesses:
FREDK. HAYNES,
EDWARD VIESER.